(12) United States Patent
Holm et al.

(10) Patent No.: US 10,583,549 B2
(45) Date of Patent: Mar. 10, 2020

(54) HANDLE AND A METHOD FOR MANUFACTURING A HANDLE

(71) Applicant: Fiskars Garden Oy Ab, Billnäs (FI)

(72) Inventors: Carl-Olof Holm, Helsinki (FI); Jouni Riikonen, Helsinki (FI)

(73) Assignee: Fiskars Garden Oy Ab, Billnäs (FI)

( * ) Notice: Subject to any disclaimer, the term of this patent is extended or adjusted under 35 U.S.C. 154(b) by 0 days.

(21) Appl. No.: 16/281,614

(22) Filed: Feb. 21, 2019

(65) Prior Publication Data

US 2019/0184542 A1 Jun. 20, 2019

Related U.S. Application Data

(62) Division of application No. 14/528,686, filed on Oct. 30, 2014, now abandoned.

(30) Foreign Application Priority Data

Nov. 4, 2013 (EP) ..................................... 13191364

(51) Int. Cl.
*B25G 1/10* (2006.01)
*B29C 45/14* (2006.01)
(Continued)

(52) U.S. Cl.
CPC .............. *B25G 1/10* (2013.01); *B25G 1/102* (2013.01); *B26B 23/00* (2013.01); *B29C 43/18* (2013.01);
(Continued)

(58) Field of Classification Search
CPC ........ Y10T 16/466; Y10T 16/476; B25G 1/10; B25G 1/102; B25G 1/01; B29C 45/14614;
(Continued)

(56) References Cited

U.S. PATENT DOCUMENTS

| 5,155,878 A | 10/1992 | Dellis |
| 5,261,665 A | 11/1993 | Downey |

(Continued)

FOREIGN PATENT DOCUMENTS

| CN | 102348540 A | 2/2012 |
| CN | 102361730 A | 2/2012 |

(Continued)

OTHER PUBLICATIONS

English Translation of Office Action for Russian Application No. 2014144138/02(071559), dated Jun. 1, 2018, 5 pages.
(Continued)

*Primary Examiner* — William L Miller
(74) *Attorney, Agent, or Firm* — Foley & Lardner LLP

(57) ABSTRACT

A method for manufacturing a handle includes manufacturing a surface portion for the handle, arranging the surface portion having a uniform thickness in a mould to contact a surface of the mould and to cover cavities which are provided in the surface in a predetermined pattern, pressing those parts of the surface portion that cover the cavities into the cavities with a mass that is introduced into the mould, and removing the handle from the mould once the mass has cured to form a rigid body which is at least partly covered by the surface portion from which protrusions arranged in the predetermined pattern protrude.

5 Claims, 2 Drawing Sheets

(51) Int. Cl.
  *B26B 23/00* (2006.01)
  *B29C 43/18* (2006.01)
  *B29L 31/46* (2006.01)
  *B29L 9/00* (2006.01)
  *B29L 31/28* (2006.01)

(52) U.S. Cl.
  CPC .... *B29C 45/1418* (2013.01); *B29C 45/14549* (2013.01); *B29C 45/14598* (2013.01); *B29C 45/14614* (2013.01); *B29L 2009/00* (2013.01); *B29L 2031/283* (2013.01); *B29L 2031/463* (2013.01); *Y10T 16/466* (2015.01)

(58) Field of Classification Search
  CPC .......... B29C 45/14549; B29C 45/1418; B29C 45/14598; B29C 43/18; B26B 23/00; B29L 2031/463; B29L 2031/283; B29L 2009/00
  USPC ....... 16/421, 430; 81/489, 22; 264/250, 251, 264/255; 74/551.9
  See application file for complete search history.

(56) References Cited

U.S. PATENT DOCUMENTS

| | | | |
|---|---|---|---|
| 5,425,176 A | 6/1995 | Brainerd et al. | |
| 5,511,445 A | 4/1996 | Hildebrandt | |
| 6,131,972 A | 10/2000 | Whitehead et al. | |
| 6,311,369 B1 | 11/2001 | Ryu | |
| 6,652,398 B2 | 11/2003 | Falone et al. | |
| 6,889,405 B2 * | 5/2005 | Ritrovato | B25G 1/10 15/143.1 |
| 7,448,299 B1 | 11/2008 | Chen | |
| 8,420,203 B2 | 4/2013 | Sikora et al. | |
| 2004/0043181 A1 | 3/2004 | Sherwood | |

FOREIGN PATENT DOCUMENTS

| | | |
|---|---|---|
| DE | 87 16 099 U1 | 1/1988 |
| DE | 10 2009 015 432 A1 | 9/2010 |
| EP | 6 010 76 B1 | 10/1996 |
| EP | 2 407 280 A1 | 1/2012 |
| GB | 2 185 209 | 7/1987 |
| GB | 2 264 062 | 8/1993 |
| TW | 201039989 A1 | 11/2010 |
| WO | WO-93/04858 A1 | 3/1993 |
| WO | WO-03/041817 A1 | 5/2003 |
| WO | WO-2004/018163 A1 | 3/2004 |
| WO | WO-2006/081842 A1 | 8/2006 |

OTHER PUBLICATIONS

English-language translation of Chinese Office Action, App. No. 201410610253.0, 10 pages (dated Oct. 24, 2017).

English-language translation of Taiwan Search Report, App. No. 103138062, 1 page (dated Dec. 20, 2017).

Search Report for European Patent Application No. EP 13 19 1364, dated Apr. 24, 2014, 4 pages.

* cited by examiner

HANDLE AND A METHOD FOR MANUFACTURING A HANDLE

CROSS REFERENCE TO RELATED APPLICATIONS

This Application claims the benefit of priority as a divisional application of U.S. patent application Ser. No. 14/528,686, which was filed on Oct. 30, 2014, and which claims the benefit of priority to European patent application no. 13191364.2, which was filed on Nov. 4, 2013, the complete disclosures of which are incorporated by reference herein.

BACKGROUND OF THE INVENTION

Field of the Invention

This invention relates to a handle for a hand tool and to a method for manufacturing a handle.

Description of Prior Art

Previously there is known a handle with an outer surface portion and with an inner rigid body. In this known solution the body is manufactured of a material with the required properties needed to obtain a handle that is strong enough, stiff enough and durable enough such that the user may direct the necessary forces towards the handle during use without braking or bending the handle. The surface portion is provided as a gripping portion of a material that ensures a good non-slippery grip for the user. The material of the surface portion is softer than the material of the rigid body.

The above mentioned known handle is manufactured with a rigid body having a smooth outer surface. In order to obtain a good non-slippery grip for the user protrusions are formed in the outer surface of the surface portion. These protrusions in the outer surface of the surface portion are obtained by manufacturing the outer surface portion to be thicker at the locations of the protrusions and thinner at the locations between the protrusions.

A drawback with a handle as described above is that the differences in the layer thickness of the surface portion results in a handle with an outer surface that is softer at the location of the protrusions where the material layer of the outer surface is thicker and harder at the locations between the protrusions where the material layer of the outer surface is thinner. Such a handle is not comfortable or practical to use. Additionally, manufacturing problems occur, as layers of different thickness need time periods of different length to cure.

SUMMARY OF THE INVENTION

An object of the present invention is to solve the above mentioned drawback and to provide a handle which is easy to manufacture and which has excellent properties during use. These and other objects are achieved with a manufacturing method according to independent claim 1.

The use of a surface portion having a uniform thickness, as an outer layer on a rigid body having protrusions in a predetermined pattern, makes it possible to obtain a desired pattern of protrusions in the surface portion without a need to vary the thickness of the surface portion.

Preferred embodiments of the invention are disclosed in the dependent claims.

BRIEF DESCRIPTION OF DRAWINGS

In the following the present invention will be described in closer detail by way of example and with reference to the attached drawings, in which.

DESCRIPTION OF AT LEAST ONE EMBODIMENT

FIGS. 1 to 4 illustrate a method of manufacturing a handle. The handle may be a handle for a gardening tool, such as a handle for a an axe, for a spade or for a lopper, for instance.

Figure 1:
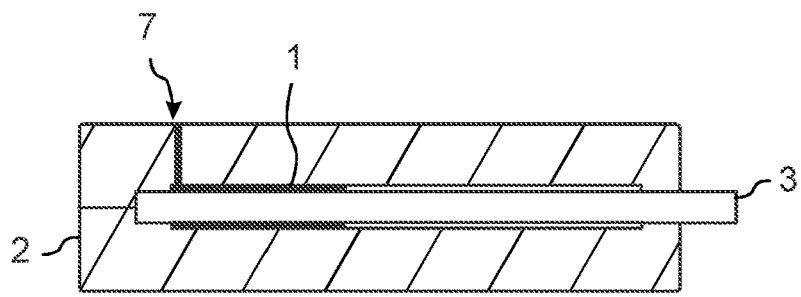
FIGS. 1 to 4 illustrate a method of manufacturing a handle.
Figure 2:

In FIG. 1 a surface portion 1 is manufactured. In this example the surface portion 1 is manufactured in a mould 2. A core 3, which may protrude from the mould 2 at one end, is arranged into the mould 2 to ensure that the surface portion 1 will be hollow. The mould is filled with a suitable plastic material via an opening 7, which after curing forms a hollow cylindrical surface portion, as illustrated in FIG. 2. The surface portion 1 has a uniform thickness. In other words, the thickness of the material layer in all parts of the surface portion is practically the same.

One alternative is to manufacture the surface portion 1 of a Thermoplastic Elastomer (TPE), which results in relatively thin and flexible surface portion capable of being stretched and which offers a user a comfortable grip when used on an outer surface of a handle. However, also other plastic materials may be utilized.

It should be observed that though the surface portion 1 is illustrated to be shaped as a hollow cylinder, this is only one example of a suitable shape. In practice the shape may be different, as the goal is to manufacture a surface portion suitable for covering at least a part of a handle. Consequently, the shape of the surface portion may depend on the intended shape of the handle.

Figure 3:
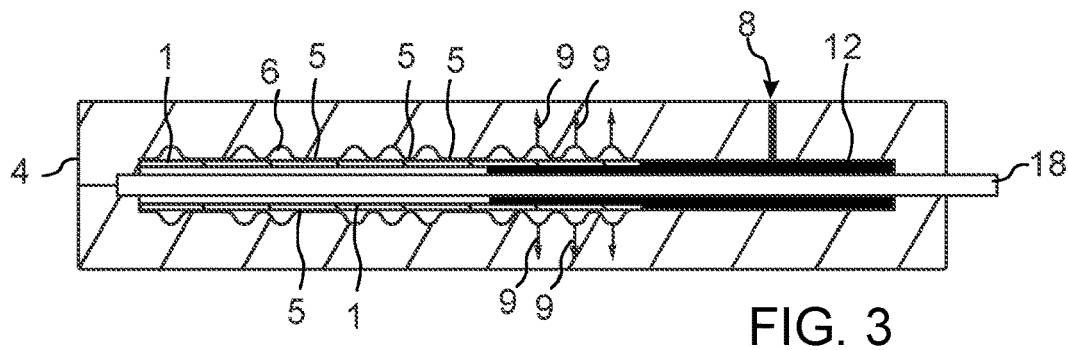
Figure 4:
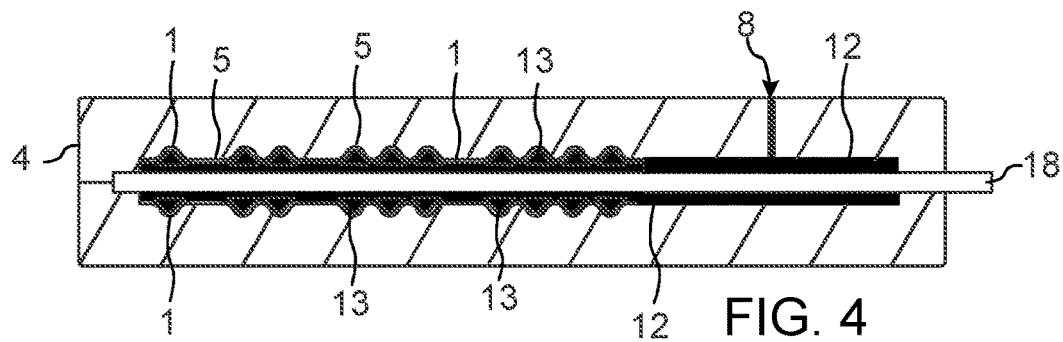

FIGS. 3 and 4 illustrate manufacturing of a rigid body for the handle. In FIGS. 3 and 4 a second mould 4 and a second core 18 are utilized. If the handle should be solid and not hollow, the handle may be manufactured without using the core 18. This second mould 4 has an inner surface 5 with cavities 6. The cavities 6 are arranged in a predetermined pattern.

The surface portion 1 is arranged in the second mould 4 such that it contacts the surface 5 of the second mould 4 and covers the cavities 6 in the surface 5 of the mould, as illustrated in FIG. 3.

In FIG. 3 the surface portion is arranged in the left end of the mould 4 and a suitable plastic material, such as a melted mass 12 is introduced into the mould via an opening 8. In FIG. 3 the right end of the mould 4 is filled with the plastic material and arrows 9 illustrate that the mass 12 presses the parts of the surface portion 1 that cover the cavities 6 into the cavities 6 until these parts of the surface portion 1 contact the bottom of each cavity 6. The plastic material used as the mass may be glass fiber reinforced Polyamid, for instance.

In FIG. 4 the entire mould 4 is filled with the mass 12 and it can be seen that the mass 12 has taken a shape that matches the shape of the inner surface 5 of the mould 4, in other words, the pattern of the cavities 6 is now present as protrusions 13 in the mass 12, which forms the rigid body 11 of the handle 10 once the mass 12 has cured. From FIG. 4 it can be seen that the surface portion 1 is present as a thin layer between the mass 12 and the inner surface 5 of the mould 4, where the surface portion 1 is located.

Figure 5:
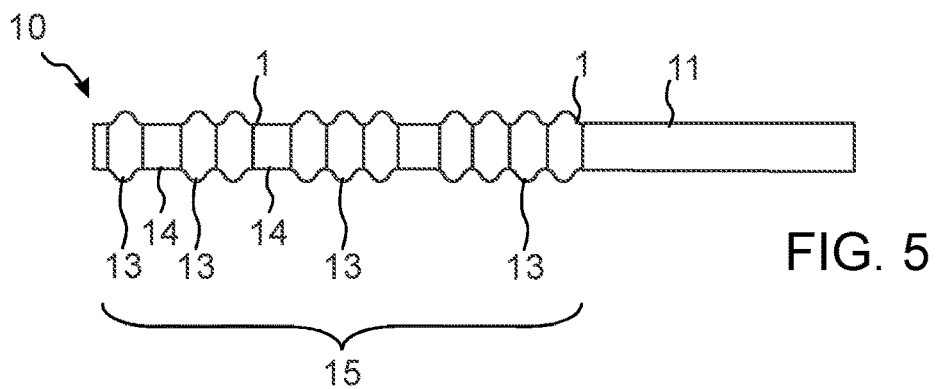
FIG. 5 illustrates an embodiment of a handle.

FIG. 5 illustrates an embodiment of a handle. This handle 10 can be manufactures as has been explained in FIGS. 1 to 4.

In FIG. 5 the mass 12 has cured and the handle 10 has been removed from the mould 4. The rigid body 11 extends all the way from the left to the right of the illustrated handle. In the left end of the rigid body lithe surface portion 1 covers the rigid body 11. The protrusions 13 of the rigid body are present in the surface portion 1 in a pattern 15 that corresponds to the pattern of the cavities 6 in the surface 5 of the mould 4.

An advantage obtained by manufacturing the handle 10 as explained above is that the thickness of the surface portion 1 remains almost constant throughout the entire surface portion 1. In other words, the relatively thin surface portion 1 that tightly follows the shape of the outer surface of the rigid body 11 has a thickness at the protrusions 13 that is the same or almost the same as the thickness of the outer portion 1 at locations 14 between the protrusions 13. This results in a practical and comfortable handle which is equally soft in all parts of the handle where the surface portion 1 is present.

In the embodiment of FIGS. 1 to 5 the cavities 6 are arranged in a predetermined pattern and the same predetermined pattern 15 is also present in the outer surface of the handle 10 as protrusions 13 in the surface portion 1. A user grabbing the handle 10 can feel this pattern 15 of the protrusions 13 and based on the pattern 15 determine which part of the handle the user has grabbed. In example of FIGS. 1 to 5 such a pattern 15 is utilized where each part of the pattern is unique and present in only one location of the surface portion 1. If the user grabbing the handle 10 can feel only one protrusion 13 in the pattern 15, the user knows that he has grabbed the left end of the handle 10, and if the other hand the user can feel four protrusions 13, the user knows that he has grabbed the handle 10 at the right most location of the surface portion 1. Therefore, without looking at the handle or the hand tool, the user can immediately determine whether or not the user has grabbed the handle at the location which he desires. This speeds up and simplifies use of a tool having such a handle.

Figure 6:
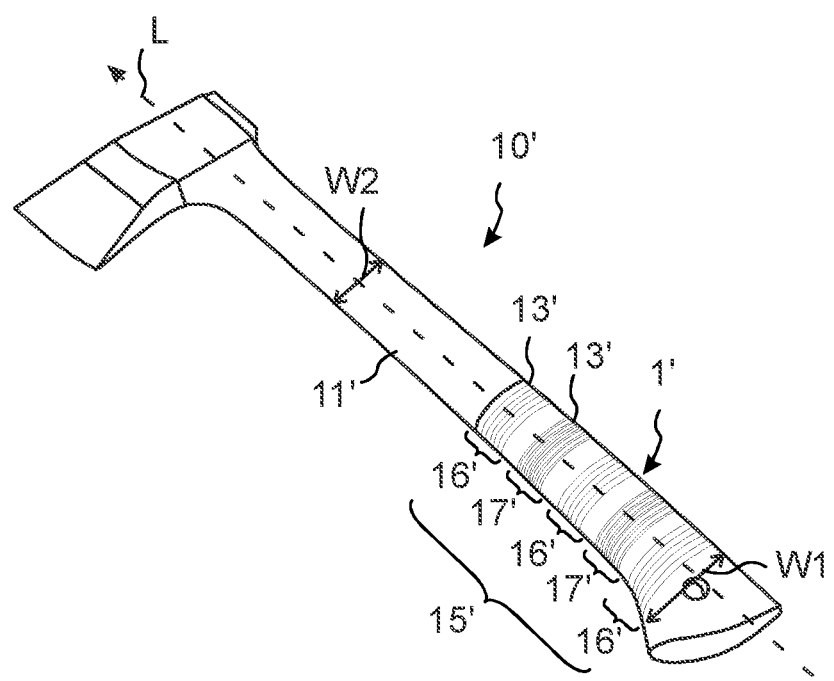
FIG. 6 illustrates a second embodiment of a handle.

FIG. 6 illustrates a second embodiment of a handle 10'. In FIG. 6 it is by way of example assumed that the handle 10' is a handle of an axe.

The handle of FIG. 6 may be manufactured in a same way as has been explained in connection with the embodiment of FIGS. 1 to 4, though the shape of the surface portion 1' and the rigid body 11' of the handle 10' is different.

In FIG. 6 the handle 10' is manufactured to have an outer shape with different dimensions at different locations of the handle along a longitudinal direction L of the handle 10'. In practice the lowermost part of the handle 10' has a first width W1 and a first thickness. At a distance from the lowermost part in the longitudinal direction L the width W2 is different than W1, and also the thickness may be different than at the lowermost part. Due to such an outer shape, a user grabbing the handle 10' can by feeling the shape of the handle roughly determine which part of the handle the user has grabbed.

Additionally, the handle 10' is provided with a predetermined pattern 15' of protrusions 13'. Due to this pattern 15' in combination with the outer shape of the handle 10' the user can very exactly feel what part of the handle 10' the user has grabbed.

In the embodiment of FIG. 6 the predetermined pattern 15' is not a pattern where each part of the pattern is unique and present in only one location, as in FIGS. 1 to 5, though such a unique pattern can be utilized also in the embodiment of FIG. 6. Instead the protrusions 13' are present in the surface portion 1' in a predetermined patter 15' including a first sub-pattern 16' which is present in at least two locations of the predetermined pattern 15' and another sub-pattern 17' which is present between the locations of the first sub-pattern 16'. In the illustrated example the first sub-pattern 16' consists of a group of protrusions 13' arranged at a larger mutual distance from each than the protrusions 13' in the second sub-pattern 17', and additionally, the number of protrusions 13' in the second sub-pattern 17' is larger than the number of protrusions 13' in the first sub-pattern 16. Though each part of the predetermined pattern 15' is not unique, but instead it includes identical sub-patterns 16' and 17' in more than one location, the user can with his hand feel where he has grabbed the handle by utilizing the predetermined pattern in combination with the outer shape of the handle.

In the drawings two alternative predetermined patterns are disclosed only by way of example. In praxis the dimensions of the protrusions in the pattern may vary and the pattern may be implemented as disclosed or as a different pattern not illustrated by the drawings. Such variations facilitating that the user can feel what part of the handle the user has grabbed will be clear for a skilled person.

It is to be understood that the above description and the accompanying figures are only intended to illustrate the present invention. It will be obvious to a person skilled in the art that the invention can be varied and modified without departing from the scope of the invention.

The invention claimed is:

1. A method for manufacturing a handle comprising:
   manufacturing a surface portion for the handle,
   arranging the surface portion having a uniform thickness in a mold to contact a surface of the mold and to cover cavities which are provided in the surface in a predetermined pattern,
   pressing those parts of the surface portion that cover the cavities into the cavities with a mass that is introduced into the mold, and
   removing the handle from the mold once the mass has cured to form a rigid body which is at least partly covered by the surface portion from which protrusions arranged in the predetermined pattern protrude.

2. The method according to claim 1, wherein the predetermined pattern is provided such that a user grabbing the handle can by feeling the predetermined pattern determine which part of the handle the user has grabbed.

3. The method according to claim 1, wherein
   the handle is manufactured to have an outer shape with different dimensions at different locations of the handle along a longitudinal direction of the handle, and
   the predetermined pattern is provided such that a user grabbing the handle can by feeling the predetermined pattern and the outer shape of the handle determine which part of the handle the user has grabbed.

4. The method according to claim 1, wherein the method comprises providing cavities in the surface in the predetermined pattern where each part of the pattern is unique and present in only one location.

5. The method according to claim 1, wherein the method comprises providing cavities in the surface in the predetermined pattern including a first sub-pattern which is present in at least two locations of the predetermined pattern and one or more other sub-patterns which are present between the locations of the first sub-pattern.

\* \* \* \* \*